3,402,157
TERPOLYMERS OF 2,3-DICHLOROBUTADIENE-1,3, α-HALOACRYLONITRILE, AND ETHYLENICALLY UNSATURATED COMPOUNDS
Wendell W. Moyer, Jr., Vienna, W. Va., and Harold W. Reader, Belpre, Ohio, assignors, by mesne assignments, to Lord Corporation, Erie, Pa., a corporation of Pennsylvania
No Drawing. Filed Mar. 25, 1964, Ser. No. 354,754
11 Claims. (Cl. 260—80.77)

This invention relates to novel, resinous, and elastomeric materials and more particularly to terpolymers of dichlorobutadiene, α-haloacrylonitrile, and at least one ethylenically unsaturated compound. These polymers have improved processing properties and yield vulcanizates having excellent properties as adhesive components.

Prior to this invention, it was known that dichlorobutadiene and especially 2,3-dichlorobutadiene-1,3 had little tendency to copolymerize with other unsaturated compounds due to its highly reactive nature. Due to its reactive nature, dichlorobutadiene was known to have a tendency to react with itself rather than with another unsaturated monomer. In light of this reactivity, it was generally accepted that 2,3-dichlorobutadiene-1,3 was exceedingly difficult to copolymerize.

In the present invention, it was found that dichlorobutadiene and especially 2,3-dichlorobutadiene-1,3 could be polymerized with α-haloacrylonitrile and ethylenically unsaturated compounds. The ethylenically unsaturated compounds are those that are polymerizable by unsaturation-addition, providing that they are non-crosslinking, i.e., that there is either only one unsaturated ethylenic group in the compound or, if more than one, that they are conjugated or crossconjugated. More specifically, the ethylenically unsaturated monomers that may be utilized in the terpolymer of this invention are those containing either a single or a plurality of $CH_2=C<$ groupings.

The ethlenically unsaturated compounds containing the $CH_2=C<$ group or groups include compounds such as styrene, p-chlorostyrene, 3,5-dichlorostyrene, p-methoxystyrene, acrylonitrile, methacrylonitrile, vinyl bromide, vinyl fluoride, vinyl iodide, vinyl acetate, vinyl proprionate, vinyl butyrate, vinyl benzoate, vinylidene bromide, vinylidene chlorofluoride, methyl methacrylate, butyl ethacrylate, methacrylamide, vinyl methyl ketone, vinyl pyridine, vinyl carbazole, vinyl methyl ether, isobutylene, and ethylene in addition to vinyl chloride and vinylidene chloride, the alkyl acrylates including methyl, ethyl, propyl, butyl, and octyl acrylates as well as other similar monoolefinic polymerizable compounds. Other unsaturated compounds containing more than one olefinic group which may be copolymerized include the conjugated dienes such as butadiene-1,3, isoprene, and the other butadiene-1,3 hydrocarbons, chloroprene, and 3-cyanobutadiene-1,3, as well as trienes such as myrcene and compounds containing olefinic and acetylenic bonds such as vinyl acetylene, vinyl ethynyl diethyl carbinol and the like.

It was found that these compounds could be polymerized to provide a terpolymer that varied between a resin and an elastomer. The α-haloacrylonitrile compound mentioned herein may be either α-chloroacrylonitrile or α-bromacrylonitrile.

The range of polymerization in this invention may be varied from about 80 to about 5 parts by weight dichlorobutadiene, from about 15 to about 60 parts by weight of α-haloacrylonitrile, and from about 5 to about 35 parts by weight of at least one ethylenically unsaturated compound.

The amounts of dichlorobutadiene, α-haloacrylonitrile, and ethylenically unsaturated compound in the polymer may extend beyond the preferred range indicated above. It has been found, however, that the most favorable elastomeric properties fall within the range of about 20 to about 60 percent by weight of α-haloacrylonitrile polymerized with the corresponding increasing and decreasing amounts of dichlorobutadiene and ethylenically unsaturated compounds. Those polymers within the broader range of about 15 to about 60 parts by weight of α-haloacrylonitrile exhibit favorable properties as components in rubber to metal adhesives. The preferred range for optimum adhesive results were obtained when the α-haloacrylonitrile content was between about 15 and about 50 parts by weight.

The polymerization of the dichlorobutadiene with the α-haloacrylonitrile as well as the ethylenically unsaturated compounds may be carried out by any of the conventional polymerization procedures. For example, solution or suspension polymerization may be used. If solution polymerization is used, the monomers, together with a catalyst and modifiers if desired, are dissolved in a suitable inert organic solvent such as toluene, benzene, tetrahydrofuran, or the like, placed in a polymerization reactor, and polymerized.

Alternatively, if suspension polymerization is used, the monomeric ingredients are suspended as relatively small droplets in an aqueous medium and permitted to copolymerize. Emulsion polymerization may also be used in which the monomers are emulsified in an aqueous medium containing an emulsifying agent, such as for example, sodium fatty acid soaps, sodium or potassium laurate, myristate-oleate, palmitate, and stearate. Other emulsifiers such as sodium laurel sulfate may also be used.

Conventional stabilizers may be used during the suspension polymerization, however, they are not absolutely essential. Unpolymerized monomers may be removed by vacuum treatment at elevated temperatures or by steam distillation. The specific method used to remove unpolymerized monomers is a matter of choice.

The polymerization is preferably carried out in a closed vessel in which the space not occupied by the reactants is maintained free of oxygen, such as by means of a blanket of nitrogen. The induction period of the polymerization reaction is lengthened by the presence of oxygen and it is preferred to eliminate the oxygen from the reaction. The polymerization may be carried out over a wide range of temperature, from about 0° C. to about 100° C. If lower temperatures than 0° C. are utilized in the emulsion or suspension polymerization, antifreeze components such as methanol should be employed.

The polymerization of the monomeric ingredients is preferably carried out by mixing the monomers and subjecting them to moderate polymerization conditions until all of the α-haloacrylonitrile, 2,3-dichlorobutadiene-1,3 and ethylenically unsaturated compound or compounds have been polymerized.

The polymerization may be promoted by the addition of free radical-generating catalysts. The presence of a catalyst in some cases assures more rapid onset of the reaction and more reproducible results. Suitable free radical-generating catalysts include hydrogen peroxide, sodium, potassium or ammonium persulfates and perborates, di-t-butyl peroxide, benzoyl peroxide, acetyl peroxide, azo-bis-isobutyronitrile, etc.

The terpolymers of 2,3 - dichlorobutadiene - 1,3—α-haloacrylonitrile—ethylenically unsaturated compounds containing in excess of about 20 percent by weight α-haloacrylonitrile are very useful flame-resistant elastomers having good swelling stability and ozone resistance. Those terpolymers containing less than about 20 percent by weight and in excess of 60 percent by weight α-haloacrylonitrile are more resinous in nature and have utility as resins rather than as elastomers.

Examples of the preparation of the terpolymers of this invention are set forth hereinbelow:

EXAMPLE I

70/25/5 dichlorobutadiene/α-bromoacrylonitrile/acrylonitrile 72.0 g. of xylene, 23.0 g. α-bromoacrylonitrile, and 5.0 g. of acrylonitrile were charged to a 500 ml. flask that had been previously equipped with a stirrer, reflux condenser, thermometer, nitrogen inlet tube and addition funnel. The addition funnel was charged with 78.0 g. of xylene, 70.0 g. of dichlorobutadiene, and 0.5 g. of α,α'-azo-bis-isobutyronitrile. The flask was flushed with nitrogen. A stream of nitrogen and constant stirring was maintained during the course of the polymerization reaction. The contents of the flask were heated to 68° C. and solution from the addition funnel was added to the flask over a three-hour and 20 minute period while the temperature was maintained in the range of 680° to 70° C. After completion of the addition, the reaction conditions were maintained for an additional 16 hours. The resulting solution was a viscous, reddish-orange polymer solution having a solids content that indicated 98 percent monomer conversion. Coagulation of the polymer provided a pale yellow rubber having an inherent viscosity of 0.17 when measured in tetrahydrofuran (0.3 g./100 ml.) at 25° C.

EXAMPLE II

70/25/5 dichlorobutadiene/α-bromoacrylonitrile/styrene

Example I was repeated substituting 5.0 g. of inhibitor-free styrene for the acrylonitrile. The solution from the addition funnel was added over a three-hour and 45 minute period. The total reaction time was 21 hours. As in Example I, the resulting polymer solution was reddish-orange, which provided a pale yellow rubber upon coagulation. The solids content indicated that there was 93 percent monomer conversion. The polymer had an inherent viscosity of 0.18 measured in tetrahydrofuran (0.3 g./100 ml.) at 25° C. The presence of styrene in the polymer was confirmed by infrared analysis.

EXAMPLE III

70/15/15 dichlorobutadiene/α-chloroacrylonitrile/α-bromoacrylonitrile 70.0 g. of inhibitor-free dichlorobutadiene, 15.0 g. of α-bromoacrylonitrile, 15.0 g. of α-chloroacrylonitrile, 70.0 g. of xylene, 144 g. water, 32.8 g. of oleic acid dilute soap solution (13.5 percent soap), 0.18 g. of ammonium persulfate, 0.27 g. of tetrasodium pyrophosphate, 0.35 g. of sodium metabisulfite, and 0.27 g. of sodium hydroxide were charged to a 32 oz. polymerization bottle. The bottle was flushed free of oxygen with carbon dioxide, capped and tumbled in a constant temperature bath at 60° C. for twenty-four hours. The resulting polymer emulsion was coagulated in 2.5 liters of methanol. 72.0 g. of brown rubber resulted therefrom.

EXAMPLE IV

70/15/15 dichlorobutadiene/α-chloroacrylonitrile/styrene 7.5 g. of α-chloroacrylonitrile, 7.5 g. styrene, 35.0 g. of dichlorobutadiene, 35.0 g. of perchloroethylene, 150 ml. of water, 0.5 g. ammonium persulfate, 1.0 g. of sodium metabisulfite, 0.5 g. of gelatin and 0.25 g. tetrasodium pyrophosphate were charged to a 32 ounce polymerization bottle. The bottle was flushed with carbon dioxide, sealed, and tumbled in a constant temperature bath at 55° C. for twenty-four hours. The resulting polymer suspension was coagulated in 1.5 liters of methanol and the precipitated polymer was washed with methanol and dried in a forced air draft oven. The yield was 50.0 g. (i.e., 100 percent conversion) cream-colored rubber having an inherent viscosity of 0.19 measured in tetrahydrofuran. The infrared spectrum of the polymer confirmed the presence of styrene units.

EXAMPLE V

70/15/15 dichlorobutadiene/α-chloroacrylonitrile/methacrylic acid 35.0 g. of dichlorobutadiene, 7.5 g. of α-chloroacrylonitrile, 7.5 g. of methacrylic acid, 200 g. xylene, and 0.5 g. of benzoyl peroxide were added to a 500 ml. three-necked flask equipped with a stirrer, heating mantle, reflux condenser, and thermometer. The flask was flushed with nitrogen and a stream of nitrogen was maintained during the course of the polymerization reaction. The contents of the flask were slowly stirred and heated to 70–80° C. and retained at that temperature for twenty-four hours. Conversion was determined to be essentially 100 percent as determined by the solids method. Coagulation of a portion into methanol yielded a yellow-colored fibrous resin. The terpolymer was soluble in benzene, dioxane, methylene chloride, and tetrahydrofuran. The resin had an inherent viscosity of 0.36 measured in tetrahydrofuran.

EXAMPLE VI

70/15/15 dichlorobutadiene/α-chloroacrylonitrile/acrylonitrile 375 g. of dichlorobutadiene, 80.0 g. of α-chloroacrylonitrile, 80.0 g. acrylonitrile, 2025 g. of xylene, and 8.0 g. of benzoyl peroxide were charged to a 5 liter three-necked flask fitted with a stirrer, heating mantle, condenser, and thermometer. The contents of the flask were slowly stirred and heated to 77–84° C. for twenty-nine hours. Conversion after twenty-nine hours was determined to be 93 percent. Coagulation of a portion in methanol followed by drying yielded a tan-colored rubber which was soluble in benzene, dioxane, methylene chloride, and tetrahydrofuran. The inherent viscosity was determined to be 0.31 measured in tetrahydrofuran.

EXAMPLE VII

70/20/10 dichlorobutadiene/α-chloroacrylonitrile/acrylonitrile

Utilizing the procedure in Example VI, 70.0 g. of dichlorobutadiene, 20.0 g. of α-chloroacrylonitrile, 10.0 g. of acrylonitrile, 233 g. of xylene, and 1.5 g. of benzoyl peroxide were charged to a one liter three-necked flask. After twenty-four hours of heating between 77–83° C. and stirring, conversion was determined to be 86 percent. Coagulation of the resulting polymer solution yielded a tough, brown-colored rubber having an inherent viscosity of 0.33 measured in tetrahydrofuran.

EXAMPLE VIII

80/15/5 dichlorobutadiene/α-chloroacrylonitrile/acrylonitrile

Utilizing the procedure of Example VI, 80.0 g. of dichlorobutadiene, 15.0 g. of α-chloroacrylonitrile, 5.0 g. of acrylonitrile, 233 g. of xylene, and 1.5 g. benzoyl peroxide were added to a 1 liter three-necked flask. After 23 hours of reaction time at 77–84° C. there was 90 percent conversion. Coagulation of the solution provided a dark-red tough rubber. The terpolymer was soluble in benzene, dioxane, methylene chloride, and tetrahydrofuran. The inherent viscosity was 0.30 measured in tetrahydrofuran.

EXAMPLE IX

75/20/5 dichlorobutadiene/α-chloroacrylonitrile/acrylonitrile

Utilizing the same procedure as Example VI, 338 g. of dichlorobutadiene, 90.0 g. of α-chloroacrylonitrile, 22.5 g. of acrylonitrile, 1035 g. of xylene, and 6.5 g. of benzoyl peroxide were added to the 2 liter, three-necked flask. After twenty-four hours of reaction time at 77–84° C., there was 97 percent conversion. Coagulation of a portion of the polymer in methanol provided a light-brown rubber having an inherent viscosity of 0.44 measured in tetrahydrofuran.

EXAMPLE X

55/40/5 dichlorobutadiene/α-chloroacrylonitrile/ acrylonitrile 35 g. of dichlorobutadiene, 25.5 g. of α-chloroacrylonitrile, 3.2 g. acrylonitrile, 35.0 g. of xylene, 0.53 g. ammonium persulfate, 1.06 g. sodium metabisulfite, 0.53 g. gelatin, and 0.27 g. of tetrasodium pyrophosphate along with 300 ml. of water were added to a one liter three-necked flask fitted with a stirrer, thermometer, reflux condenser, and nitrogen inlet tube. The flask was flushed with nitrogen and a slow stream of nitrogen was maintained during the course of the reaction. The mixture was stirred constantly and heated to a temperature of 55° C. for twenty-four hours. At the end of the twenty-four hour period, the reflux condenser was replaced by a 12-inch Vigreux column fitted with a distillation head and the mixture was steam distilled until the xylene and unreacted monomers were removed. A light brown rubber was mechanically removed from the flask and dried, yielding 53.7 g., ie., 84 percent conversion. The rubber had an inherent viscosity of 0.66 measured in tetrahydrofuran.

EXAMPLE XI

60/35/5 dichlorobutadiene/α-chloroacrylontrile/ acrylonitrile 120 g. of dichlorobutadiene, 70.0 g. of α-chloroacrylonitrile, 10.0 g. acrylonitrile, 120 g. xylene, 177 g. of methylisobutyl ketone, and 1.5 g. of azo-bis-isobutryronitrile were added to a one liter three-necked flask fitted with a stirrer, thermometer, and nitrogen inlet tube. The system was flushed with nitrogen, and a slow stream of nitrogen was maintained throughout the reaction. The mixture was slowly stirred and the reaction was heated to 66–70° C. for a twenty-two hour period. The resulting polymer solution was coagulated in two liters of methanol after which it was dried in a vacuum oven for twenty-four hours at 50° C. and 5 mm. of mercury. The yield was 183 g. or 91.5 percent conversion. The rubber was light brown and had an inherent viscosity of 0.54 measured in tetrahydrofuran.

EXAMPLE XII

50/25/25 dichlorobutadiene/α-chloroacrylonitrile/ chloroprene 125 g. of dichlorobutadiene, 62.5 g. of α-chloroacrylonitrile, 62.5 g. of 2-chlorobutadiene-1,3, 188 g. of xylene, 187 g. of methylisobutyl ketone, and 2.5 g. of azo-bis-isobutyronitrile were charged to a 2 liter three-nicked flask equipped with a condenser, stirrer, nitrogen inlet tube and thermometer. The contents of the flask were slowly stirred under an atmosphere of nitrogen and heated to a temperature of between 68 and 71° C. for two hours and thirty-five minutes. Conversion was determined by the solids method and it was found that there was 99.8 percent conversion. A 50 ml. aliquote was coagulated in 600 ml. of methanol and yielded a tan-colored rubber which was soluble in xylene, methylisobutylketone, tetrahydofuran, and dimethylformamide.

EXAMPLE XIII

50/25/25 dichlorobutadiene/α-bromoacrylonitrile/ chloroprene

Utilizing the same procedure as that of Example XII, 62.5 g. of α-bromoacrylonitrile were substituted for the α-chloroacrylonitrile. The reaction temperature was retained in the area of 68 to 79° C. After three and a quarter hours of reaction time, the solids conversion was determined to be 97 percent. The terpolymer was coagulated in methanol and yielded a tough tan rubber having solubility properties similar to the terpolymer of Example XII.

The terpolymers of this invention possess extraordinary properties when incorporated into an adhesive to be used for bonding rubber to metal and metal to rubber. In general, the use of the terpolymers of this invention results in the formation of bonds to rubber under more adverse conditions as well as vulcanization with a greater variety of different rubbers than is the case with the presently used rubber to metal adhesives.

All of the normally used natural rubbers and synthetic rubbers that are bonded to various metals, such as aluminum, brass, bronze, nickel, steel, etc. may be adhered by employing adhesive containing the terpolymers of this invention.

An adhesive composition containing the terpolymers of this invention is normally interposed between the surface of a rubber body and the surface of a metal body to which it is desired to bond the rubber. The adhesive film is generally provided by application of a solvent solution containing the terpolymer, along with other adhesive compounding materials, and thereafter permitting the solvent to evaporate.

The solvents employed in formulating the adhesive materials of this invention are preferably aromatic hydrocarbons, ketones, esters, or chlorinated hydrocarbons. However, any organic solvent or mixture of solvents in which the ingredients to be applied are soluble may be used. The specific solvent utilized should be chosen bearing in mind the viscosity of the solution and means of application employed. The solvent employed should also be relatively volatile to obviate the necessity of long drying periods. The preferred solvents are the aromatic hydrocarbons such as benzene, toluene, xylene, etc. and chlorinated hydrocarbons such as monochlorobenzene, dichlorobenzene, perchloroethylene, etc.

In adhesive compositions, it is generally necessary to provide a viscosity regulator and film forming component. If the adhesive compositions employ the terpolymers of this invention, such compounds as chlorinated natural rubber, chlorinated polypropylene, and vinyl chloride-vinylidene chloride copolymers, phenolic resins, etc., find utility as the film forming compound although other compounds may be equally appropriate.

The adhesive composition may also utilize fillers, extenders, and coloring agents such as carbon black, as well as various metallic oxides, etc. These fillers are inert from the standpoint of affecting the adhesive properties of the copolymers.

Substantially all of the rubber to metal adhesives utilize acid stabilizers. Some of the more effective acid stabilizers, in the presence of the adhesive compositions of this invention are such compounds as dibasic lead fumerate, dibasic lead phosphite, dibasic lead sulfate and the like.

The curing agents utilized in the adhesive compositions are many and varied, however, good results have been obtained utilizing paraquinonedioxime, 1,3-bis-(2-benzothiazolylmercaptomethyl) - urea, benzothiazyldisulfide, 4,4'-dithiodimorpholine, dinitrosobenzene, and the like.

The relative ratios of the terpolymers to the film forming resin ingredients of the present invention may range from 10 to 90 percent terpolymer to 90 to 10 percent of the film forming resin with the preferred range being between 20 and 90 weight percent terpolymer with correspondingly 80 to 10 percent resin.

Generally, the solids content of the adhesive composition in solution may range from as low as 5 percent to as high as about 50 percent solids.

The adhesive is normally applied to a metal surface and allowed to stand until the solvent has evaporated. The metal surface and the rubber surface which are to be bonded are brought together and heated under pressure to cause vulcanization. The time and temperature of curing depends upon the nature of the body being bonded as well as the nature of the ingredients in the adhesive phase.

One of the primary features of the terpolymer adhesive compositions of the present invention is the extraordinary bond strength which is obtained between the rubber and metal. When utilizing the adhesive system of this invention, it is ordinarily impossible to separate the rubber from the metal without rupturing or splitting the rubber stock used in the test.

The following rubber stocks were used in the samples given below and are provided to illustrate the use of the terpolymers of this invention with certain specific rubber stocks. The rubber stocks are provided to illustrate the invention and it will be understood that other rubber stocks may be utilized with equal success.

BUTADIENE-STYRENE RUBBER

| | Parts |
|---|---|
| SBR 1500 rubber | 100 |
| N,N-diphenylethylenediamine | 0.52 |
| Zinc oxide | 7.04 |
| Easy processing channel black | 60.13 |
| Asphaltic resin plasticizer | 4.05 |
| Coal tar saturated hydrocarbon plasticizer | 1.60 |
| 2-benzothiazolyl disulfide | 0.25 |
| Tetramethylthiuran disulfide | 0.25 |
| Sulfur | 2.02 |

BUTYL RUBBER STOCK

| | |
|---|---|
| Isobutylene-isoprene rubber | 100 |
| Stearic acid | 1 |
| Zinc oxide | 5 |
| Easy processing channel black | 10 |
| Semi-reinforced furnace black | 45 |
| Dibenzoyl-para-quinonedioxime | 6 |
| Red lead | 10 |

NATURAL RUBBER STOCK

| | |
|---|---|
| Smoked sheet | 100 |
| Stearic acid | 3 |
| Zinc oxide | 8 |
| Phenyl-beta-naphthylamine | 1.20 |
| Easy processing channel black | 46 |
| Semi-reinforced furnace black | 8 |
| Pine tar | 2 |
| 2-benzothiazolyl disulfide | 1 |
| Sulfur | 3 |

NITRILE STOCK

| | |
|---|---|
| Butadiene-acrylonitrile rubber copolymer | 100 |
| Zinc oxide | 5 |
| Stearic acid | 0.5 |
| Easy processing channel black | 50.0 |
| Tricresyl phosphate | 7.5 |
| Dibutyl phthalate | 7.5 |
| Sulfur | 1.5 |
| 2-benzothiazolyl disulfide | 1.5 |

2-CHLOROBUTADIENE-1,3 RUBBER STOCK

| | |
|---|---|
| 2-chlorobutadiene-1,3 | 100 |
| Phenyl-beta-naphthylamine | 2 |
| Magnesium oxide | 4 |
| Semi-reinforced furnace black | 50 |
| Zinc oxide | 7 |
| Sulfur | 1 |
| Piperidinium pentamethylene dithiocarbonate | 0.25 |

The following examples illustrate the use of the adhesive compositions, formed from the terpolymers of this invention, in bonds of elastomer stocks to cold rolled steel. In each example, the bond strength was determined in accordance with ASTM Standards, Strip Test D–429–58, Method B.

Example A

An adhesive was formulated utilizing 3.0 g. of 70/25/5 dichlorobutadiene/α-bromoacrylonitrile/acrylonitrile, and 7.0 g. of chlorinated natural rubber. The terpolymer and chlorinated natural rubber were dissolved in 30.0 g. of xylene. The adhesive formulation was applied to a strip of cold rolled steel in the form of a thin film and allowed to dry. A styrene-butadiene rubber stock (formulated as shown above) was placed in contact with the adhesive film and the assembly was cured in a press at 307° F. for a period of about 25 minutes. The bond strength was tested and determined in accordance with the ASTM Standard Strip Test. It was found that there was 100 percent rubber failure at an average pull strength of about 148 pounds per inch.

This adhesive was also applied to a second strip of cold, rolled steel and allowed to dry. A strip of natural rubber stock was placed in contact with the adhesive film and the assembly was placed in a press at about 307° F. for a period of about 20 minutes. The bond strength was tested and determined as with the styrene-butadiene rubber above and it was found that there was 100 percent rubber failure at an average pull strength of about 131 pounds per inch.

A third strip of cold rolled steel was provided with the adhesive formulated above and allowed to dry. A strip of butyl rubber was placed in contact with the adhesive film and the assembly was cured in a press at 320° F. for about twenty minutes. The bond strength was tested and determined in accordance with ASTM Standard Strip Test and it was found that there was 100 percent rubber failure at an average pull strength of about 73 pounds per inch.

A fourth strip of cold rolled steel was provided with the adhesive formulated above and allowed to dry. A strip of nitrile rubber stock was placed in contact with the adhesive film and the assembly was cured in a press at about 320° F. for about twenty minutes. The bond strength was tested and determined as in those assemblies above and it was found that there was 94 percent rubber failure at an average pull strength of 137 pounds per inch.

A fifth strip of cold rolled steel was provided with the adhesive formulated above and allowed to dry. A strip of 2-chlorobutadiene-1,3 rubber stock was placed in contact with the adhesive and the assembly was cured in a press at about 310° F. for about twenty-five minutes. The bond strength was tested and determined in accordance with ASTM Standard Strip Test as in the assemblies above and it was found that there was 100 percent rubber failure at an average pull strength of about 104 pounds per inch.

Example B

An adhesive was formulated utilizing 3.5 g. of 75/20/5 dichlorobutadiene/α - chloroacrylonitrile/acrylonitrile terpolymer, 6.5 g. of chlorinated natural rubber, 1.0 g. of dibasic lead phosphite, 2.0 g. of carbon black, 0.3 g. para-quinone dioxime, 0.6 g. of 2-benzoylthiazolyl disulfide, and 0.6 g. of p-dinitrosobenzene, all of which were dissolved or dispersed in 48 g. of xylene. A strip of cold rolled steel was cleaned and the adhesive formulation was applied thereto in the form of a thin film and allowed to dry.

Butadiene-styrene rubber stock (formulated as above) was placed in contact with the adhesive film and the assembly was cured in a press at 307° F. for a period of about 25 minutes. The bond strength was tested and determined in accordance with the ASTM Standard Strip Test. There was 100 percent rubber failure at an average pull strength of about 155 pounds per inch.

Natural rubber stock (formulated as above) was placed in contact with a second strip of cold rolled steel that was cleaned and provided with an adhesive layer as above, and the assembly was placed in a press and cured at a temperature of about 307° F. for a period of twenty minutes. The bond strength was tested and determined in accordance with ASTM Standard Strip Test. It was found that there was 100 percent rubber failure at an average pull strength of about 135 pounds per inch.

The adhesive formulation of Example B was applied to a third strip of cold rolled steel in the form of a thin film and allowed to dry. Butyl rubber stock formulated as above, was placed in contact with the adhesive film and the assembly was cured in a press at about 320° F. for about twenty minutes. The bond strength was determined as in examples above and it was found that there was 100 percent rubber failure at an average pull strength of about 95 pounds per inch.

The adhesive formulation of Example B was applied to a fourth strip of cold rolled steel in the form of a thin film and allowed to dry. Nitrile rubber stock formulated as above, was placed in contact with the adhesive film and the assembly was cured in a press at about 320° F. for about twenty minutes. The bond strength was tested and determined in this as in the examples above and it was found that there was 95 percent rubber failure at an average pull strength of about 137 pounds per inch.

The adhesive formulation of Example B was applied to a fifth strip of cold rolled steel in the form of a thin film and allowed to dry. 2-chlorobutadiene-1,3 rubber stock was placed in contact with the adhesive film and the assembly was cured in a press at about 310° F. for about twenty-five minutes. The bond strength was tested and determined as in the examples above and it was found that there was 95 percent rubber failure at an average pull strength of about 100 pounds per inch.

Example C

An adhesive was formulated substituting 3.5 g. 80/15/5 dichlorobutadiene/α - chloroacrylonitrile/acrylonitrile terpolymer for the terpolymer of Example B. A strip of cold rolled steel was cleaned and the adhesive formulation was applied thereto in the form of a thin film and allowed to dry.

Styrene-butadiene rubber stock was placed in contact with the adhesive film and the assembly was cured and tested as indicated in Example B above. There was 98 percent rubber failure at an average pull strength of 155 pounds per inch.

Natural rubber was placed in contact with a second strip of cold rolled steel and the assembly was cured and tested as in Example B above. There was 100 percent rubber failure at an average pull strength of 130 pounds per inch.

Butyl rubber was placed in contact with a third strip and the assembly was cured and tested as in Example B above. There was 100 percent rubber failure at an average pull strength of 95 pounds per inch.

Example D

An adhesive was formulated as in Example B above substituting 3.5 g. of 75/22/3 dichlorobutadiene/α-chloroacrylonitrile/acrylonitrile terpolymer for the dichlorobutadiene/α - chloroacrylonitrile/acrylonitrile terpolymer of that example. Strips of cold rolled steel were cleaned and the adhesive formulation was applied thereto in the form of a thin film and allowed to dry. Butadiene-styrene rubber stock was placed in contact with one of the strips and the assembly was cured and tested as in Example B above. There was 98 percent rubber failure at an average pull strength of 160 pounds per inch.

Natural rubber was placed in contact with the adhesive film of the second strip and the assembly was cured and tested as in Example B above. There was 100 percent rubber failure at an average pull strength of 145 pounds per inch.

Butyl rubber stock was placed in contact with the adhesive film on a third strip and the assembly was cured and tested as in Example B above. There was 100 percent rubber failure at an average pull strength of 87 pounds per inch.

Example E

An adhesive was formulated utilizing 3.0 g. of 70/25/5 dichlorobutadiene/α - bromoacrylonitrile/acrylonitrile terpolymer, 7.0 g. of chlorinated natural rubber which were dissolved or dispersed in 30.0 g. of xylene. No curing agent was utilized. Strips of cold, rolled steel were cleaned and the adhesive formulation was applied thereto in the form of a thin film and allowed to dry. Styrenebutadiene rubber stock was placed in contact with the adhesive film on the first strip. The assembly was cured and tested as in Example B above. There was 96 percent rubber failure at an average pull strength of 143 pounds per inch.

Natural rubber stock was placed in contact with the adhesive film on a second strip. The assembly was cured and tested as in Example B above. There was 100 percent rubber failure at an average pull strength of 107 pounds per inch.

Butyl rubber stock was placed in contact with a third strip of cold rolled steel and the assembly was cured and tested as in Example B above. There was 100 percent rubber failure at an average pull strength of 80 pounds per inch.

Example F

An adhesive was formulated utilizing 3.0 g. of 70/25/5 dichlorobutadiene/α - bromoacrylonitrile/styrene terpolymer along with 7.0 g. of chlorinated natural rubber. These ingredients were dissolved or dispersed in 30 g. of xylene. Strips of cold rolled steel were cleaned and the adhesive formulation was applied thereto in the form of a thin film and allowed to dry.

Styrene-butadiene rubber stock was placed in contact with the adhesive film on the first strip and the assembly was cured and tested as in Example B above. There was 78 percent rubber failure at an average pull strength of 146 pounds per inch.

Natural rubber stock was placed in contact with the adhesive film on the second strip of cold rolled steel and the assembly was cured and tested as in Example B above. There was 98 percent rubber failure at an average pull strength of 117 pounds per inch.

Butyl rubber stock was placed in contact with the adhesive film on a third strip of cold rolled steel and the assembly was cured and tested as in Example B above. There was 90 percent rubber failure at an average pull strength of about 72 pounds per inch.

It will be noted that in the examples above, there were adhesive formulations provided without using a curing agent. In those examples, it was possible to obtain up to 100 percent rubber failure which indicates that the adhesives may, in certain cases, be formulated without curing agents. Although the formulating additives may vary over a wide range, the terpolymer ordinarily does not exceed 60 to 70 percent of the adhesive formulation. The terpolymer in specific cases may comprise in excess of 90 percent and less than 20 percent of the adhesive formulation.

While a limited number of embodiments of the terpolymer and the adhesive formulations have been disclosed, it will be understood that modifications and variations are possible without departing from the inventive concept disclosed herein. It is therefore intended that only such limitations be placed on the appended claims as are stated within the claims or required by the prior art.

The invention claimed is:
1. A random terpolymer comprising:
   from about 5 parts by weight to about 85 parts by weight of 2,3-dichlorobutadiene-1,3,
   and
   correspondingly from about 10 parts by weight to about 60 parts by weight of a α-haloacrylonitrile,
   and
   from about 5 parts by weight to about 35 parts by weight of at least one ethylenically unsaturated compound copolymerizable with the dichlorobutadiene and α-haloacrylonitrile, said compound having at least one CH$_2$=C< group therein.

2. A random terpolymer comprising:
from about 5 parts by weight to about 85 parts by weight of 2,3-dichlorobutadiene-1,3,
and
correspondingly from about 15 parts by weight to about 60 parts by weight of α-haloacrylonitrile,
and
from about 5 parts by weight to about 35 parts by weight of at least one ethylenically unsaturated compound copolymerizable with the dichlorobutadiene and α-haloacrylonitrile, said compound having at least one CH$_2$=C< group therein.

3. An elastomeric random terpolymer comprising:
from about 85 parts by weight to about 5 parts by weight of 2,3-dichlorobutadiene-1,3,
and
correspondingly from about 20 parts by weight to about 60 parts by weight of α-haloacrylonitrile,
and
from about 5 parts by weight to about 35 parts by weight of at least one ethylenically unsaturated compound copolymerizable with the dichlorobutadiene and α-haloacrylonitrile, said compound having at least one CH$_2$=C< group therein.

4. A random terpolymer comprising:
from about 5 parts by weight to about 85 parts by weight of 2,3-dichlorobutadiene-1,3,
and
correspondingly from about 10 parts by weight to about 60 parts by weight of α-bromoacrylonitrile,
and
from about 5 parts by weight to about 35 parts by weight of at least one ethylenically unsaturated compound copolymerizable with the dichlorobutadiene and α-haloacrylonitrile, said compound having at least one CH$_2$=C< group therein.

5. A random terpolymer comprising:
from about 5 parts by weight to about 85 parts by weight of 2,3-dichlorobutadiene-1,3,
and
correspondingly, from about 10 parts by weight to about 60 parts by weight of α-chloroacrylonitrile,
and
from about 5 parts by weight to about 35 parts by weight of at least one ethylenically unsaturated compound copolymerizable with the dichlorobutadiene and α-haloacrylonitrile, said compound having at least one CH$_2$=C< group therein.

6. A process of making a random terpolymer which comprises:
polymerizing a mixture of from about 5 to about 85 parts by weight of 2,3-dichlorobutadiene-1,3,
and
about 10 to about 60 parts by weight of α-haloacrylonitrile,
and
from about 5 parts by weight to about 35 parts by weight of at least one ethylenically unsaturated compound copolymerizable with the dichlorobutadiene and α-haloacrylonitrile, said compound having at least one CH$_2$=C< group therein,
in an aqueous emulsion at a temperature of about 0° to about 80° C.,
for a period of about one to about forty-eight hours,
in the presence of a free-radical generating catalyst selected from the group consisting of hydrogen peroxide, sodium, potassium, and ammonium persulfates and perborates, benzoyl peroxide, acetyl peroxide, azo-bis-isobutyronitrile, and di-t-butyl peroxides.

7. An adhesive composition for bonding rubber to metal comprising:
from about 20 parts by weight to about 90 parts by weight of a terpolymer, said random terpolymer consisting of
from about 5 to about 85 parts by weight of dichlorobutadiene,
from about 10 parts by weight to about 60 parts by weight of α-haloacrylontrile,
and
from about 5 parts by weight to about 35 parts by weight of at least one ethylenically unsaturated compound copolymerizable with the dichlorobutadiene and α-haloacrylonitrile, said compound having at least one CH$_2$=C< group therein,
and
correspondingly from about 80 parts by weight to about 10 parts by weight of a film-forming compound selected from the group consisting of chlorinated natural rubber, chlorinated polypropylene, vinyl chloride copolymers, phenolic resins and the like.

8. An adhesive composition for bonding rubber to metal comprising:
from about 20 parts by weight to about 90 parts by weight of a random terpolymer,
said terpolymer consisting of from about 5 parts by weight to about 85 parts by weight of dichlorobutadiene,
from about 10 parts by weight to about 60 parts by weight of α-bromoacrylonitrile,
and
from about 5 parts by weight to about 35 parts by weight of at least one ethylenically unsaturated compound, copolymerizable with the dichlorobutadiene and α-haloacrylonitrile, said compound having at least one CH$_2$=C< group therein,
and
correspondingly from about 80 parts by weight to about 10 parts by weight of a film-forming compound selected from the group consisting of chlorinated natural rubber, chlorinated polypropylene, vinyl chloride copolymers, phenolic resins and the like.

9. An adhesive composition for bonding rubber to metal comprising:
from about 20 parts by weight to about 90 parts by weight of a random terpolymer,
said terpolymer consisting of from about 5 to about 85 parts by weight of dichlorobutadiene,
from about 10 parts by weight to about 60 parts by weight of α-chloroacrylonitrile,
and
from about 5 parts by weight to about 35 parts by weight of at least one ethylenically unsaturated compound copolymerizable with the dichlorobutadiene and α-haloacrylonitrile, said compound having at least one CH$_2$=C< group therein,
and
correspondingly from about 80 parts by weight to about 10 parts by weight of a film-forming compound selected from the group consisting of chlorinated natural rubber, chlorinated polypropylene, vinyl chloride copolymers, phenolic resins and the like.

10. A process of making a random terpolymer which comprises:
polymerizing a mixture of from about 5 to about 85 parts by weight of 2,3-dichlorobutadiene-1,3,
and
about 10 to about 60 parts by weight of α-haloacrylonitrile,
and
from about 5 parts by weight to about 35 parts by weight of at least one ethylenically unsaturated compound copolymerizable with the dichlorobutadiene and α-haloacrylonitrile, said compound having at least one CH$_2$=C< group therein,
in a suspension polymerization,
for a period of about one to about forty-eight hours,
in the presence of a free-radical generating catalyst selected from the group consisting of hydrogen peroxide, sodium, potassium, and ammonium persulfates and perborates, benzoyl peroxide, acetyl peroxide, azo-bis-isobutyronitrile, and di-t-butyl peroxides.

11. A process of making a random terpolymer which comprises:

polymerizing a mixture of from about 5 to about 85 parts by weight of 2,3-dichlorobutadiene-1,3, and about 10 to about 60 parts by weight of α-haloacrylonitrile, and from about 5 parts by weight to about 35 parts by weight of at least one ethylenically unsaturated compound copolymerizable with the dichlorobutadiene and α-haloacrylonitrile, said compound having at least one $CH_2=C<$ group therein, in a solution polymerization, for a period of about one to about forty-eight hours, in the presence of a free-radical generating catalyst selected from the group consisting of hydrogen peroxide, sodium, potassium, and ammonium persulfates and perborates, benzoyl peroxide, acetyl peroxide, azo-bis-isobutyronitrile, and di-t-butyl peroxides.

References Cited

UNITED STATES PATENTS

| | | | |
|---|---|---|---|
| 2,394,406 | 2/1946 | Schoenfeld | 260—80.7 |
| 2,900,292 | 8/1959 | Coleman et al. | 260—92.3 |
| 3,249,594 | 5/1966 | Donat et al. | 260—80.7 |

JOSEPH L. SCHOFER, *Primary Examiner.*

J. C. HAIGHT, *Assistant Examiner.*

UNITED STATES PATENT OFFICE
CERTIFICATE OF CORRECTION

Patent No. 3,402,157                 September 17, 1968

Wendell W. Moyer, Jr., et al.

It is certified that error appears in the above identified patent and that said Letters Patent are hereby corrected as shown below:

Column 10, cancel lines 66 through Column 14, line 8, and inse

1. A normally solid random terpolymer consisting essentiall of:
    from about 5 parts by weight to about 85 parts by weight of 2,3-dichlorobutadiene-1,3,
    and
    correspondingly from about 10 parts by weight to about 60 parts by weight of α-haloacrylonitrile,
    and
    from about 5 parts by weight to about 35 parts by weight of at least one ethylenically unsaturated compound copolymerizable with the dichlorobutadiene and α-haloacrylonitrile, said compound having at least one $CH_2 = C{<}$ group therein.

2. A normally solid random terpolymer consisting essentially of:
    from about 5 parts by weight to about 85 parts by weight of 2,3-dichlorobutadiene-1,3,
    and
    correspondingly from about 15 parts by weight to about 60 parts by weight of α-haloacrylonitrile,
    and
    from about 5 parts by weight to about 35 parts by weight of at least one ethylenically unsaturated compound copolymerizable with the dichlorobutadiene and α-haloacrylonitrile, said compound having a least one $CH_2 = C{<}$ group therein.

3. An elastomeric normally solid random terpolymer consistin essentially of:
    from about 85 parts by weight to about 5 parts by weight of 2,3-dichlorobutadiene-1,3,
    and
    correspondingly from about 20 parts by weight to about 60 parts by weight of α-haloacrylonitrile,
    and
    from about 5 parts by weight to about 35 parts by weight of at least one ethylenically unsaturated compound copolymerizable with the dichlorobutadiene and α-haloacrylonitrile, said compound having at least one $CH_2 = C{<}$ group therein.

4. A normally solid random terpolymer consisting essentially of:

from about 5 parts by weight to about 85 parts by weight of 2,3-dichlorobutadiene-1,3,
and
correspondingly from about 10 parts by weight to about 60 parts by weight of α-bromoacrylonitrile,
and
from about 5 parts by weight to about 35 parts by weight of at least one ethylenically unsaturated compound copolymerizable with the dichlorobutadiene and α-bromoacrylonitrile, said compound having at least one $CH_2 = C<$ group therein.

5. A normally solid random terpolymer consisting essentially of:

from about 5 parts by weight to about 85 parts by weight of 2,3-dichlorobutadiene-1,3,
and
correspondingly, from about 10 parts by weight to about 60 parts by weight of α-chloroacrylonitrile,
and
from about 5 parts by weight to about 35 parts by weight of at least one ethylenically unsaturated compound copolymerizable with the dichlorobutadiene and α-chloracrylonitrile, said compound having at least one $CH_2 = C<$ group therein.

6. A process of making a normally solid random terpolymer which comprises:

polymerizing a mixture consisting essentially of from about 5 to about 85 parts by weight of 2,3-dichlorobutadiene-1,3,
and
about 10 to about 60 parts by weight of α-haloacrylonitrile,
and
from about 5 parts by weight to about 35 parts by weight of at least one ethylenically unsaturated compound copolymerizable with the dichlorobutadiene and α-haloacrylonitrile, said compound having at least one $CH_2 = C<$ group therein,
in an aqueous emulsion at a temperature of about 0° to about 80° C.,
for a period of about one to about forty-eight hours,
in the presence of a free-radical generating catalyst selected from the group consisting of hydrogen peroxide, sodium, potassium, and ammonium persulfates and perborates, benzoyl peroxide, acetyl peroxide, azo-bis-isobutyronitrile, and di-t-butyl peroxides.

7. An adhesive composition for bonding rubber to metal comprising:

from about 20 parts by weight to about 90 parts by weight of a normally solid random terpolymer, said terpolymer consisting of from about 5 to about 85 parts by weight of dichlorobutadiene, from about 10 parts by weight to about 60 parts by weight of α-haloacrylonitrile, and from about 5 parts by weight to about 35 parts by weight of at least one ethylenically unsaturated compound copolymerizable with the dichlorobutadiene and α-haloacrylonitrile, said compound having at least one $CH_2 = C<$ group therein, and correspondingly from about 80 parts by weight to about 10 parts by weight of a film-forming compound selected from the group consisting of chlorinated natural rubber, chlorinated polypropylene, and copolymers of vinyl chloride and vinylidene chloride.

8. An adhesive composition for bonding rubber to metal comprising:

from about 20 parts by weight to about 90 parts by weight of a normally solid random terpolymer, said terpolymer consisting of from about 5 parts by weight to about 85 parts by weight of dichlorobutadiene, from about 10 parts by weight to about 60 parts by weight of α-bromoacrylonitrile, and from about 5 parts by weight to about 35 parts by weight of at least one ethylenically unsaturated compound copolymerizable with the dichlorobutadiene and α-bromoacrylonitrile, said compound having at least one $CH_2 = C<$ group therein, and correspondingly from about 80 parts by weight to about 10 parts by weight of a film-forming compound selected from the group consisting of chlorinated natural rubber, chlorinated polypropylene, and copolymers of vinyl chloride and vinylidene chloride.

9. An adhesive composition for bonding rubber to metal comprising:

from about 20 parts by weight to about 90 parts by weight of a normally solid random terpolymer, said terpolymer consisting of from about 5 to about 85 parts by weight of dichlorobutadiene, from about 10 parts by weight to about 60 parts by weight of α-chloroacrylonitrile, and from about 5 parts by weight to about 35 parts by weight of at least one ethylenically unsaturated compound copolymerizable with the dichlorobutadiene and α-chloroacrylonitrile, said compound having at least one CH$_2$ = C< group therein, and correspondingly from about 80 parts by weight to about 10 parts by weight of a film-forming compound selected from the group consisting of chlorinated natural rubber, chlorinated polypropylene, and copolymers of vinyl chloride and vinylidene chloride.

10. A process of making a normally solid random terpolymer which comprises:

polymerizing a mixture consisting essentially of from about 5 to about 85 parts by weight of 2,3-dichlorobutadiene-1,3, and about 10 to about 60 parts by weight of α-haloacrylonitrile, and from about 5 parts by weight to about 35 parts by weight of at least one ethylenically unsaturated compound compolymerizable with the dichlorobutadiene and α-haloacrylonitrile, said compound having at least one CH$_2$ = C< group therein, in a suspension polymerization, for a period of about one to about forty-eight hours, in the presence of a free-radical generating catalyst selected from the group consisting of hydrogen peroxide, sodium, potassium, and ammonium persulfates and perborates, benzoyl peroxide, acetyl peroxide, azo-bis-isobutyronitrile and di-t-butyl peroxides.

11. A process of making a normally solid random terpolymer which comprises:

polymerizing a mixture consisting essentially of from about 5 to about 85 parts by weight of 2,3-dichlorobutadiene-1,3, and about 10 to about 60 parts by weight of α-haloacrylonitrile, and from about 5 parts by weight to about 35 parts by weight of at least one ethylenically unsaturated compound copolymerizable with the dichlorobutadiene and α-haloacrylonitrile, said compound having at least one CH$_2$ = C< group therein, in a solution polymerization, for a period of about one to about forty-eight hours, in the presence of a free-radical generating catalyst selected from the group consisting of hydrogen peroxide, sodium, potassium and ammonium persulfates and perborates, benzoyl peroxide, acetyl peroxide, azo-bis-isobutyronitrile, and di-t-butyl peroxides.

Signed and sealed this 9th day of December 1969.

(SEAL)
Attest:

EDWARD M. FLETCHER, JR.
Attesting Officer

WILLIAM E. SCHUYLER, JR.
Commissioner of Patents